Aug. 23, 1966  J. F. EARP  3,267,638
SIX-PACK HANDLE APPLYING MACHINE
Filed Sept. 30, 1963  9 Sheets-Sheet 2

INVENTOR.
JAMES F. EARP
BY
Bower & Patalidis
ATTORNEYS

Aug. 23, 1966  J. F. EARP  3,267,638
SIX-PACK HANDLE APPLYING MACHINE
Filed Sept. 30, 1963  9 Sheets-Sheet 3

FIG. 3

INVENTOR.
JAMES F. EARP
BY Bower & Patalidis
ATTORNEYS

Aug. 23, 1966  J. F. EARP  3,267,638
SIX-PACK HANDLE APPLYING MACHINE
Filed Sept. 30, 1963  9 Sheets-Sheet 6

INVENTOR.
JAMES F. EARP
BY
Bower & Patalidis
ATTORNEYS

Aug. 23, 1966    J. F. EARP    3,267,638
SIX-PACK HANDLE APPLYING MACHINE
Filed Sept. 30, 1963    9 Sheets-Sheet 9

INVENTOR.
JAMES F. EARP
BY
Bower & Patalidis
ATTORNEYS

United States Patent Office 3,267,638
Patented August 23, 1966

3,267,638
SIX-PACK HANDLE APPLYING MACHINE
James F. Earp, Orchard Lake, Mich., assignor to
Ex-Cell-O Corporation, Detroit, Mich.
Filed Sept. 30, 1963, Ser. No. 312,554
9 Claims. (Cl. 53—48)

This invention relates generally to the can packaging art, and more particularly to a novel and improved high-speed machine for automatically grouping cans into six-packs and applying a pair of combination packaging and carrying hand clips to each of said six-packs.

At the present time it is common practice in the can packaging art to secure together, by means of a pair of suitable clips made from a plastic or like material, a group of six cans of beer, pop or the like, into a pack commonly known as a six-pack. The clips function to retain the cans in a compact package and to provide a carrying handle for the package. Heretofore, clips of this type have been applied to six-packs by means of manually operated pressure devices or air operated machines. Such prior art clip applying devices and machines are slow and costly to operate. Accordingly, it is the primary object of the present invention to provide a novel and improved high-speed machine for automatically applying a pair of combination packaging and carrying handle clips to a group of six cans which may contain beer, pop or the like.

It is another object of the present invention to provide a novel and improved high-speed machine for automatically applying a pair of combination packaging and carrying handle clips to a group of six cans by means of a rotary clip applicator means which may be adapted to apply the clips to the top and bottom ends of the cans either successively or simultaneously.

It is a further object of the present invention to provide a novel and improved high-speed machine for automatically applying a pair of combination packaging and carrying handle clips to a group of six cans and which is compact in construction, economical of manufacture, and fast and efficient in operation to provide low cost can packaging.

It is still another object of the present invention to provide a novel and improved high-speed automatic six-pack can clip applying machine which includes a base member on which is operatively mounted a continuously operating rotary clip applying means for applying a combination packaging and carrying handle clip to each of the top and bottom ends of a pack of six cans in a roll-on manner as the pack is moved past the rotary clip applying means, a can clip magazine feeder means for storing and feeding the clips to the rotary clip applying means, a can grouping and transfer means operatively mounted on said base member for grouping cans fed to the machine into packs of six cans each, and moving said packs into operative engagement with said rotary clip applying means, and a power drive means for operating the can grouping and transfer means, the rotary clip applying means and the clip magazine feeder means in a predetermined timed relationship.

Other objects, features and advantages of this invention will be apparent from the following detailed description, appended claims, and the accompanying drawings.

In the drawings:

FIG. 6 is an enlarged, fragmentary, vertical, sectional view of the structure illustrated in FIG. 4, taken along the line 6—6 thereof, and looking in the direction of the arrows;

Figure 1:
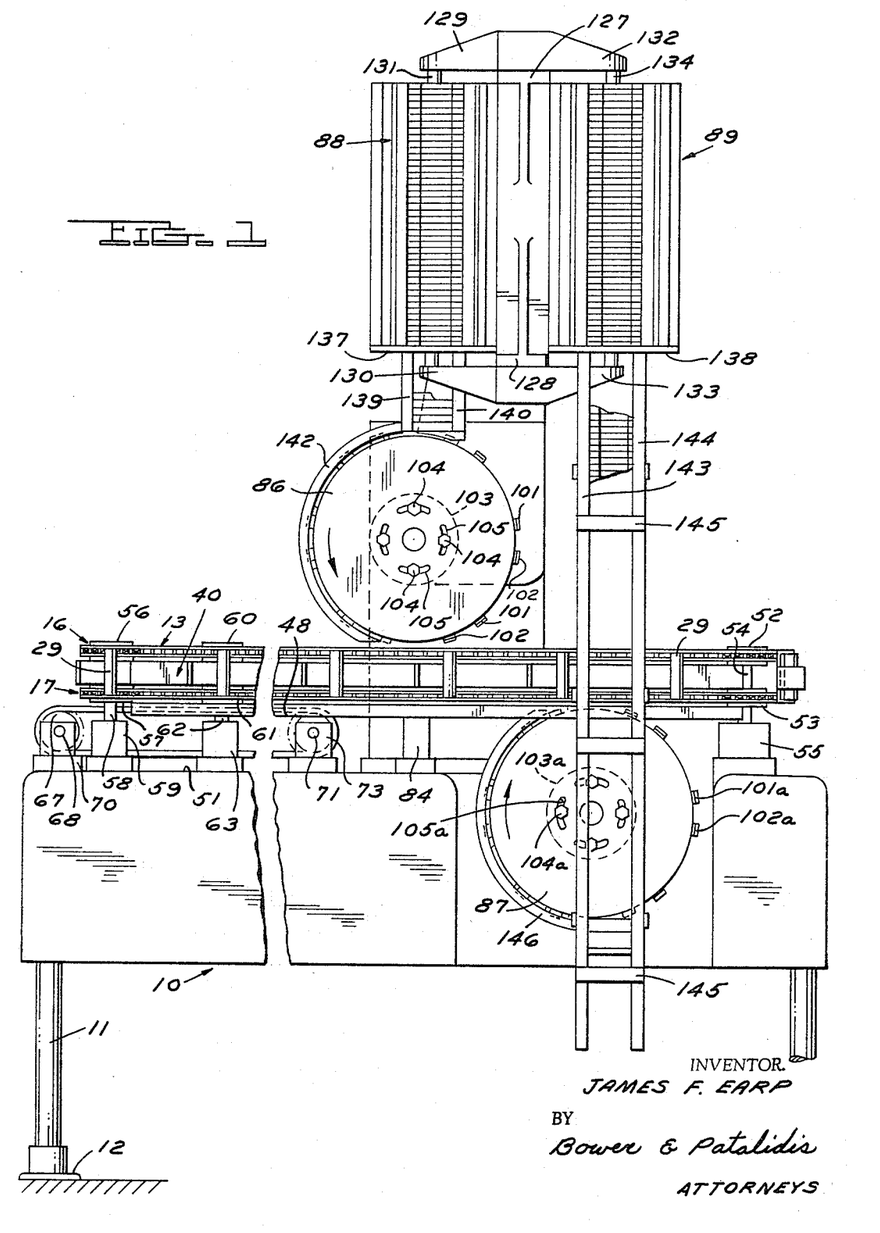
FIG. 1 is a front elevational view of a high speed, automatic, six-pack can clip applying machine made in accordance with the principles of the present invention.
Figure 2:
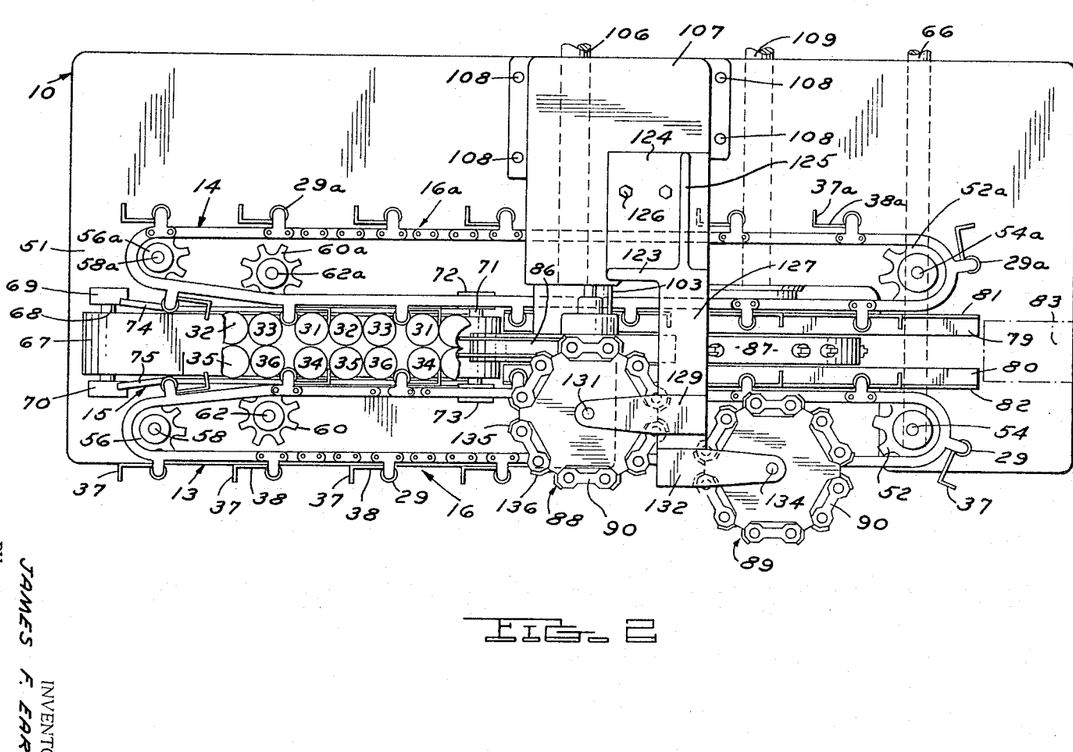
FIG. 2 is a top plan view of the structure illustrated in FIG. 1.
Figure 3:
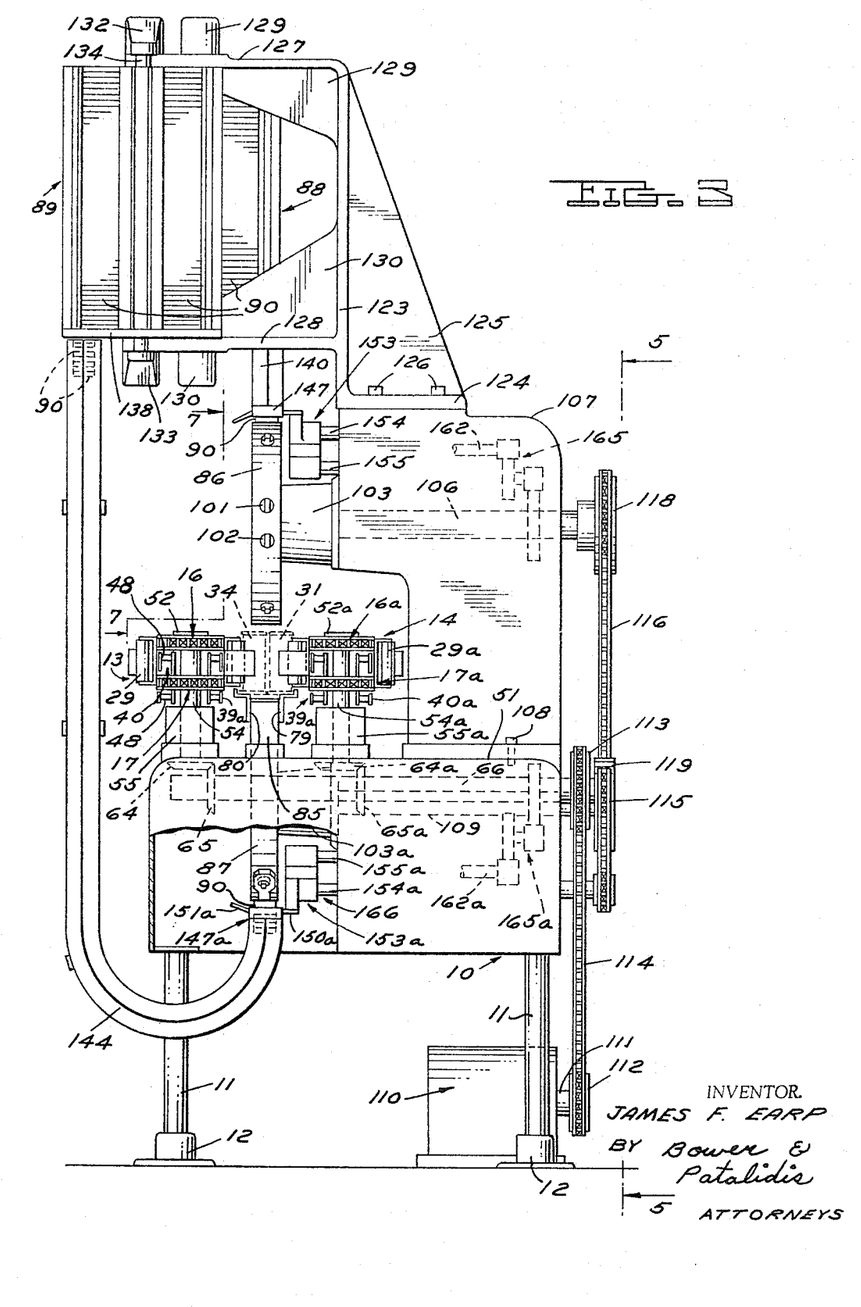
FIG. 3 is a right end, elevational view of the structure illustrated in FIG. 2, with parts removed and parts broken away, taken along the line 3—3 thereof, and looking in the direction of the arrows.

Referring now to the drawings and in particular to FIGS. 1, 2 and 3, the numeral 10 generally indicates the base member of an illustrative embodiment of the invention. The base member 10 extends longitudinally of the machine and may be made in any manner and from any suitable material, as for example, it may be made from a cast metal. The base member 10 is provided with a plurality of suitable supporting uprights, as the posts 11, which are provided at the lower ends thereof with the ground engaging flanges 12.

The clip applying machine of the present invention is provided with a can grouping and transfer means which is constructed to receive a double line of cans which have been properly orientated by a conventional orientation machine adapted to feed the cans onto the left or entrance end of the clip applying machine, as viewed in FIGS. 1 and 2. The can grouping and transfer means separates the cans fed into the machine into properly spaced groups of six cans each for the reception of a pair of combination packaging and carrying handle clips, as more fully described hereinafter. As shown in FIGS. 1–5, the can grouping and transfer means includes the pair of laterally spaced apart movable chain mechanisms, generally indicated by the numerals 13 and 14, which extend longitudinally of the base member 10. The can grouping and transfer means further includes a can track and guide structure generally indicated by the numeral 15 and which is disposed longitudinally on the base member between the chain mechanisms 13 and 14.

The chain mechanisms 13 and 14 are similarly constructed. Accordingly, the chain mechanism 13 will be described in detail and the identical parts of the chain mechanism 14 will be marked with corresponding reference numerals followed by the small letter "a." As best seen in FIGS. 1 and 2, the chain mechanism 13 includes a pair of horizontaly disposed, vertically aligned chains 16 and 17. The chains 16 and 17 may be of any suitable construction. As shown in FIG. 6, the chains 16 and 17 each comprises a plurality of vertically spaced apart pairs of links which are hingedly connected by means of the hinge pins 18 and 19, respectively.

Figure 4:
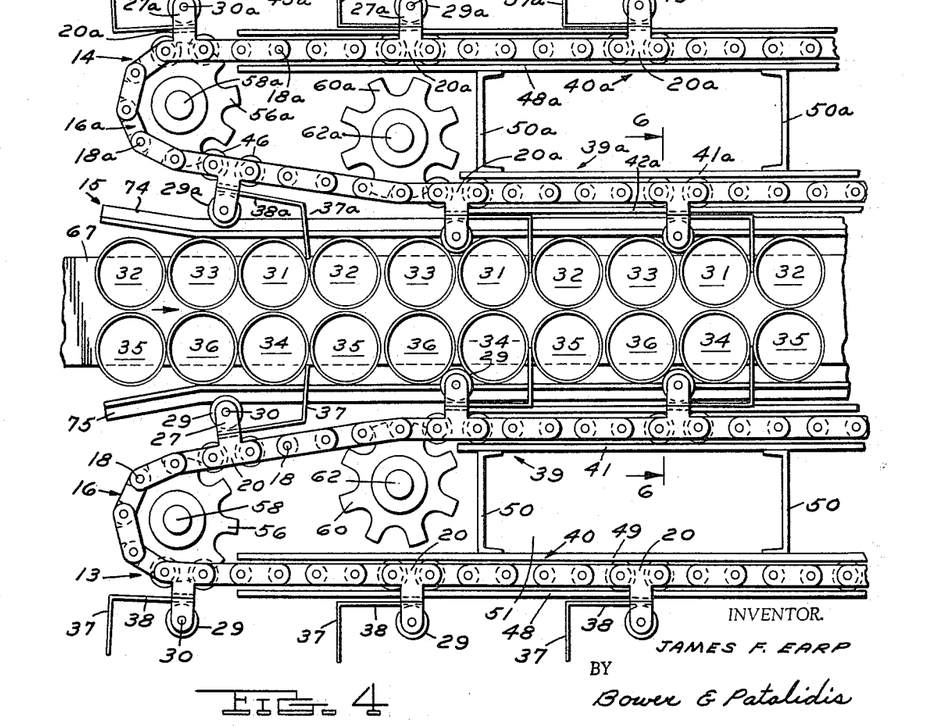
FIG. 4 is an enlarged, fragmentary, top plan view of the left end of the structure illustrated in FIG. 2.

The upper chain 16 is fixedly connected to the lower chain 17 by the following described can grouping and pusher structure. As shown in FIGS. 4 and 6, every sixth pair of chain links 20 and 21 in the upper chain 16 extends sidewardly outwardly and is interconnected on the outer sides thereof by the integral vertically disposed plates 22. Every sixth pair of links 23 and 24 in the chain 17 is also extended sidewardly outwardly, and is interconected by the integral vertically disposed plates 25. Fixedly mounted to the outer sides of each pair of plates 22 and 25, as by welding, is a vertically disposed mounting bracket plate 26 having the integral outwardly extended horizontal flanges 27 and 28 on the upper and lower ends thereof, respectively. Rotatably mounted by means of a shaft 30 between each set of horizontal bracket flanges 27 and 28 is a vertically disposed grouping roller 29.

It will be seen that as the inwardly disposed portions of the endless chain mechanisms 13 and 14 are moved to the right as viewed in FIG. 4, the grouping rollers 29 and 29a will separate the double line of cans entering the machine into groups of six cans, as indicated by the numerals 31 through 36. Each of the chain mechanisms 13 and 14 is also provided with a plurality of inwardly extended vertical spacer plates 37 which are each disposed a distance spaced apart from each grouping roller 29 in the direction in which the chain advances during operation of the machine. Each of the spacer plates 37 is fixedly connected to the adjacently disposed grouping roller bracket plate 26 by means of the integral plate arm 38. The spacer plates 37 and 37a function to maintain the proper spacing between the cans 31 and 32, and the cans 34 and 35 during a clip applying operation.

As shown in FIGS. 1 through 6, the endless chain mechanisms 13 and 14 are guided in their operative travel paths from one end of the base member 10 to the other by means of a pair of laterally spaced apart inner and outer roller guide tracks generally indicated by the numerals 39 and 40, respectively. The inner guide track 39 comprises the vertical plate 41 and the pair of inwardly spaced apart, vertical plates 42 and 43. The plates 42 and 43 are vertically spaced apart and are connected at the lower ends thereof to the plate 41 by any suitable means, as by a plurality of spacer members 44 and 45, respectively.

Rotatably mounted on the lower ends of each pair of hinge pins 18, which secure the chain links 20 and 21 together, is a suitable roller 46 which is adapted to roll between the plates 41 and 42 for guiding the chain 16 in its endless travel. The lower chain 17 is provided with similar guiding rollers 47 which roll between the plates 43 and 41. The outer roller guide track 40 is similarly constructed and guides the rollers 46 and 47 between similar vertical plates as indicated by the pair of plates 48 and the plate 44, as shown in FIGS. 1, 3 and 4. The aforedescribed inner and outer chain guide tracks 39 and 40 are spaced apart by any suitable means, as by means of a plurality of vertically disposed suitable support members as the channel members 50, as shown in FIG. 4. The channel members 50 would be connected to the chain guide track plates 41 and 48 by any suitable means, as by welding. The channels 50 are fixedly mounted on the upper side 51 of the base member 10 so as to support the chains in a position elevated above the base member. As shown in FIG. 4, the outer guide track 40 extends beyond the end of the guide track 39 at the entrance end of the machine. Each of the endless chain mechanisms 13 and 14 is provided with a chain guide structure as described hereinabove.

Each of the endless chain mechanisms 13 and 14 is reversed in its travel at each end of the machine by the following described structure. As best seen in FIGS. 1 and 2, the upper chain 16 of the chain mechanism 13 is operatively engaged with the horizontal drive sprocket 52 for reversal of the chain 16 at the discharge end of the machine. The lower chain 17 of the chain mechanism 13 is similarly engaged with the horizontal drive sprocket 53. The drive sprockets 52 and 53 are fixedly mounted on the vertical drive shaft 54 which is rotatably supported, adjacent its lower end, in a suitable journal block 55 which is mounted on the upper side 51 of base member 10.

The upper chain 16 of the chain mechanism 13 is reversed in its travel at the entrance end of the machine by means of the horizontally disposed idler sprocket 56. The lower chain 17 of the chain mechanism 13 is also reversed at the entrance end of the machine by means of a similar idler sprocket 57. The idler sprockets 56 and 57 are fixedly mounted on the rotatable vertical idler shaft 58 which is suitably journalled at the lower end thereof in the journal block 59 mounted on the upper side 51 of the base member 10.

As best seen in FIG. 2, the idler sprockets 56 and 57 are smaller in overall outer diameter than the drive sprockets 52 and 53 so as to maintain the entrance end of the chain mechanisms 13 and 14 in outwardly diverging positions for clearance between the chain mechanisms and the infeeding cans. The chains 16 and 17 of chain mechanism 13 are guided inwardly toward the infeeding cans by means of the idler sprockets 60 and 61 which are operatively mounted on the vertical shaft 62 (FIG. 1). The lower end of the shaft 62 is suitably rotatably journalled in the journal block 63 mounted on the upper side 51 of the base member 10. It will be seen that the sprockets 60, 60a and 61, 61a guide the inwardly disposed, can engaging portions of the chain mechanisms 13 and 14 in a converging direction during the initial movement towards the infeeding cans so as to bring the grouping rollers 29 and 29a, and the spacer plates 37 and 37a into operative position between a pair of cans.

As shown in FIG. 3, the lower ends of the sprocket drive shafts 54 and 54a extend inwardly into a hollow portion of the base member 10. Fixedly mounted on the lower ends of the shafts 54 and 54a are the driven bevel gears 64 and 64a which are meshably engaged with the driving bevel gears 65 and 65a, respectively. The driving bevel gears 65 and 65a are operatively mounted on the front end of the horizontally disposed drive shaft 66 which is suitably rotatably journalled in the base member 10. The rear end of the drive shaft 66 extends outwardly of the rear side of the base member 11 and is connected to a suitable power drive means, as more fully described hereinafter.

The can track and guide structure 15 includes the continuous infeed idler conveyor belt 67, as shown in FIGS. 1, 2 and 4. The infeed conveyor 67 is adapted to receive a double line of cans which have been deposited thereon by a conventional can orientation machine. The outer end of the conveyor belt 67 is mounted around the horizontal shaft 68 at the entrance end of the can grouping and transfer means. The shaft 68 is journalled in suitable bearing blocks, as indicated by the numerals 69 and 70, which are fixedly mounted on the upper side 51 of the base 10. The conveyor belt 67 is disposed between the entrance ends of the chain mechanisms 13 and 14 and extends longitudinally inwardly between the same for approximately one-third the length of the machine or a distance sufficient for the can grouping and forming chains 13 and 14 to operatively engage the infeeding cans and separate the same into six-packs. The inner end of the conveyor belt 67 is mounted around the horizontal shaft 71 which is rotatably mounted in suitable bearing blocks, as indicated by the numerals 72 and 73, which are fixedly mounted on the upper side 51 of the base 10.

As shown in FIGS. 2, 4 and 6, the front end of the can track and guide structure further includes the pair of spaced apart, longitudinally extended angle bars 74 and 75 which are disposed on opposite sides of the conveyor belt 67, for sliding engagement by the lower edges of the infeeding cans, for guiding the same longitudinally of the machine. The outer ends of these angle bars are spread apart to permit easy entrance between the same of the infeeding cans. The angle bars 74 and 75 are suitably supported by a plurality of cross plates 76 which are carried on the spaced apart longitudinally extended supporting angle bars 77 and 78, as shown in FIG. 6. The angle bars 74 and 75 and the cross plates 76 are suitably fixed to the angle bars 77 and 78 by any suitable means, as by welding. The vertically extended legs of the angle bars 77 and 78 are disposed on opposite sides of the conveyor belt 67 and are fixedly secured to the upper side 51 of the base 10 by any suitable means, as by welding. The last-mentioned can guide structure extends inwardly of the machine to a point adjacent the inner end of the conveyor belt 67.

The can track and guide structure 15 further includes the pair of laterally spaced apart, vertical plates 79 and 80 which function as can slides and which are shown in FIGS. 2 and 3. Fixedly mounted to the outer sides of the can slide plates 79 and 80 are the longitudinally extended angle bars 81 and 82, respectively. The can guide structure formed by the spaced apart, vertical slide plates 79 and 80 and the angle bars 81 and 82 extends from the inner end of the infeed conveyor belt 67 to the discharge end or right end of the machine, as viewed in FIG. 2. This last described portion of the can track and guide structure conveys the cans past the rotary clip applying means and onto the discharge conveyor 83, as more fully described hereinafter. The inner ends of the vertical slide plates 79 and 80 are fixedly secured, as by welding, to a suitable support post 84 which is fixedly mounted on the upper side 51 of the base 10, as shown in FIG. 1. The outer end of the vertical slide plates 79 and 80 are similarly fixedly secured to the support post 85, as shown in FIG. 3. The angle bars 81 and 82 are fixedly secured to the vertical plates 79 and 80 by any suitable means, as by welding.

Figure 16:
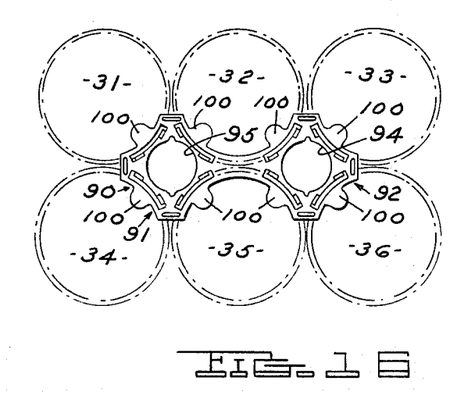
FIG. 16 is a top plan view of a six-pack of cans held together with clips applied by a machine made in accordance with the principles of the present invention.
Figure 17:
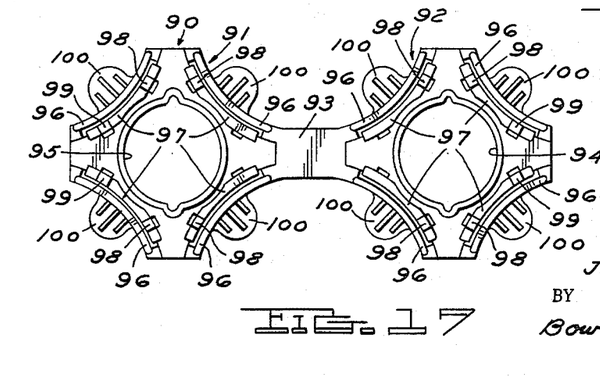
FIG. 17 is an enlarged, bottom plan view of the six-pack can clip shown in FIG. 16; and, FIG. 18 is a top plan view of the six-pack can clip illustrated in FIG. 17.
Figure 18:
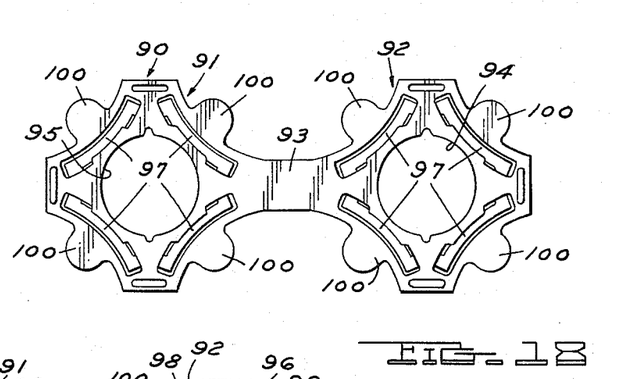

The aforedescribed can grouping and transfer means moves the cans in packs of six each into operative engagement with a continuously operating rotary clip applying means, which includes the top clip applicator drum 86 and the bottom clip applicator drum 87, for snapping a suitable plastic clip or the like onto the top and bottom ends of the cans to secure them into a compact six-pack package, as illustrated in FIG. 16. As shown in FIGS. 1, 2, 3 and 5, the top and bottom clip applicator drums 86 and 87 are supplied with a continuous supply of clips from a clip magazine feeder means which includes a pair of turret type clip feeder magazines generally indicated by the numerals 88 and 89. FIGS. 16, 17 and 18 illustrate a suitable clip 90 made from a plastic material or the like which may be applied by the machine of the present invention. The plastic clip 90 is merely illustrative of the type of can clips which may be automatically applied by the machine of the present invention to a group of six cans to convert them into a compact package and provide a carrying handle for the package.

As best seen in FIGS. 17 and 18, the clip 90 includes two clusters of semi-circular, quarter-moon clips generally indicated by the numerals 91 and 92 and which are arranged around the finger grip holes 94 and 95, respectively. The clip clusters 91 and 92 are integrally connected by the flexible plastic strip 93. FIG. 18 is a top view of the clip 90 and FIG. 17 is a bottom view of the same.

Each of the clip clusters 91 and 92 contains four sets of clips and each set includes an inner gripping lip 96 and an outer gripping lip 97. Each of the outwardly disposed pair of outer gripping lips 97 in each cluster is provided with a pair of guiding fingers 98 and 99. The remaining lips 97 have only one guiding finger 98 thereon. As more fully described hereinafter, the inner gripping lips 96 grip the inner sides of the rims of the cans and the outer gripping lips 97 grip the outer sides of the rims of the cans. Each inner gripping lip 96 is provided with a finger release tab 100 which may be pulled upwardly or away from the cans to release the inner gripping lip 96 from the same to remove the can from the six-pack. All of the inner and outer gripping lips and finger tabs and guiding fingers have been marked with the same reference numerals in both of the clip clusters 91 and 92.

Figure 5:
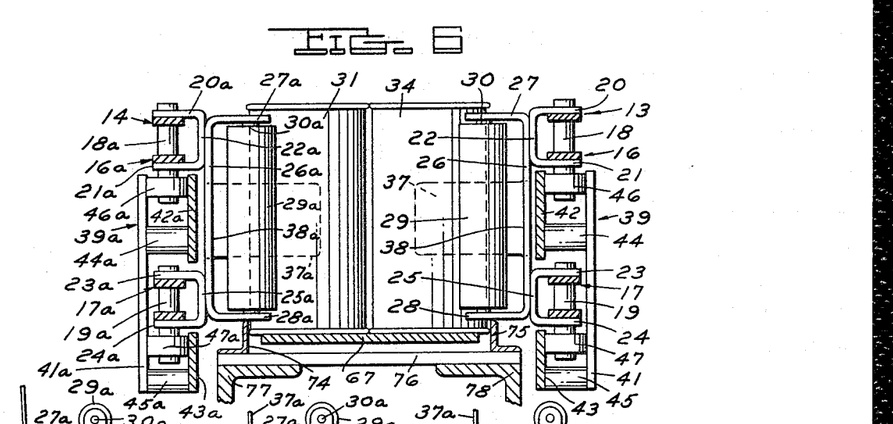
FIG. 5 is a partial, rear, elevational view of the structure illustrated in FIG. 3, taken along the line 5—5 thereof, and looking in the direction of the arrows.

As shown in FIGS. 1, 2, 3 and 5, the top clip applicator drum 86 is disposed above the can guide track means and between the chain members 13 and 14. The clip applicator drum 86 is provided with a plurality of pairs of locating lugs 101 and 102 around the periphery thereof. The locating lugs 101 and 102 are adapted to engage a clip in the finger holes 94 and 95 for applying the clip in a rolling-on action to the top ends of a group of six cans. As best seen in FIGS. 1 and 3, the top applicator drum 86 is secured to the hub 103 by means of a plurality of suitable bolts 104. The applicator drum 86 is provided with a plurality of arcuate slots as 105 through which the bolts 104 pass whereby the drum 86 may be radially adjusted relative to the hub 103 for timing purposes. As shown in FIGS. 3 and 5, the hub 103 is fixedly mounted on the front end of a drive shaft 106 which is suitably rotatably journalled in the vertical standard or housing 107. The housing 107 is fixedly secured to the upper side 51 of the base member 10 by any suitable means, as by the bolts 108. The shaft 106 extends outwardly through the rear side of the housing 107 and is adapted to be driven by a suitable power drive means as described hereinafter.

The bottom clip applicator drum 87 is also aligned between the chain mechanisms 13 and 14, but it is disposed below the same and under the can guide and track means 15, as shown in FIGS. 1, 2 and 3. It will be seen that the bottom clip applicator drum 87 is disposed in a position longitudinally spaced apart from the top clip applicator drum 86. As shown in FIG. 1, the bottom applicator drum 87 is similarly mounted on a hub 103a by means of the bolts 104a which pass through the holes 105a. The hub 103a is fixedly connected to the front end of the drive shaft 109 which is suitably rotatably mounted in the base member 10. The rear end of the drive shaft 109 extends outwardly of the base member 10 for operation by a suitably powered drive means described hereinafter. The bottom clip applicator drum is provided with locating lugs 101a and 102a on the periphery thereof in the same manner as the top clip applicator drum 86.

The power drive means for operating the can grouping and transfer means, the rotary clip applying means and the clip magazine feeder means in a pre-determined timed relationship is illustrated in FIGS. 3 and 5. The power drive means includes a suitable combined motor and gear reduction means, generally indicated by the numeral 110, and which is shown as being disposed below the machine. The motor means 110 is provided with an output shaft 111 in which is fixedly mounted the drive sprocket 112. Fixedly mounted on the rear end of the chain drive shaft 66 is the driven sprocket 113, and this sprocket is driven by the drive chain 114 which is trained around the sprockets 112 and 113. A drive sprocket 115 is fixedly mounted on the outer end of the shaft 66 at a position spaced outwardly from the sprocket 113. The sprocket 115 is drivingly engaged with a second endless chain 116 for driving the clip applicator drums 86 and 87 and the clip magazine feeder means. As best seen in FIG. 5, the driven sprocket 117 is fixedly mounted on the rear end of the bottom clip applicator drum drive shaft 109. A simliar driven sprocket 118 is mounted on the rear end of the top clip applicator drum drive shaft 106. An idler sprocket 119 is rotatably mounted on a suitable shaft 120 which is secured to the rear side of the base member 10. A pair of conventional belt tighteners 121 and 122 are operatively mounted on the rear side of the base member 10 and are operatively engaged by the drive chain 116.

As shown in FIGS. 1, 2 and 3, the clip magazines 88 and 89 are rotatably mounted above the base member 10 by the following described structure. The clip magazine supporting structure includes the vertical plate 123 which is provided on the lower end thereof with the integral flange 124. The flange 124 is seated on the upper end of the housing 107 and is secured thereto by any suitable means, as by the machine screws 126. A stiffener bracket 125 is integrally formed between the plate 123 and the flange 124. As best seen in FIG. 3, the magazine supporting plate 123 is provided with a pair of vertically spaced apart, outwardly extended arms 127 and 128, and these arms extend over the aforedescribed can grouping and transfer means.

As best seen in FIGS. 1 and 2, the clip magazines 88 and 89 are formed as hollow cylinders or drums with a plurality of clip stacking means around the periphery thereof. These drums are rotatably supported by the arms 127 and 128. The clip magazine drum 88 is rotatably mounted on the vertical shaft 131 which is carried between the horizontal arms 129 and 130 which are in turn fixedly secured to the support arms 127 and 128, respectively. The drum support arms 129 and 130 are disposed longitudinally of the base member. A similar set of clip drum supporting arms 132 and 133 is fixedly mounted to the support arms 127 and 128, respectively, and are disposed in a position outwardly and spaced apart from the drum support arms 129 and 130. The drum support arms 132 and 133 support the vertical shaft 134 on which is rotatably mounted the clip magazine drum 89.

As best seen in FIG. 2, each of the clip magazine drums 88 and 89 are provided around the periphery thereof with a pair of spaced longitudinally extended angle bars 135 and 136 which form a plurality of storage stacks for clips 90. As illustrated in FIG. 1, a plate as 137 and 138 would be mounted below the clip magazine drums 88 and 89, respectively, for maintaining the clips 90 in the various stacks on the drums. The plates 137 and 138 would have a hole through one location to permit one of the stacks on the drums to discharge the clips 90 downwardly into guide tracks for delivery to the clip applicator drums 86 and 87. The clip magazine drums 88 and 89 may be rotated about the shafts 131 and 134, respectively, for index thereabout, either manually or with the aid of suitable mechanical automatic indexing means. The clip magazine drums 88 and 89 would be moved to the position shown in FIG. 2 so that one of the stacks would be disposed parallel to the vertical plane of the clip applicator drums 86 and 87.

Figure 7:
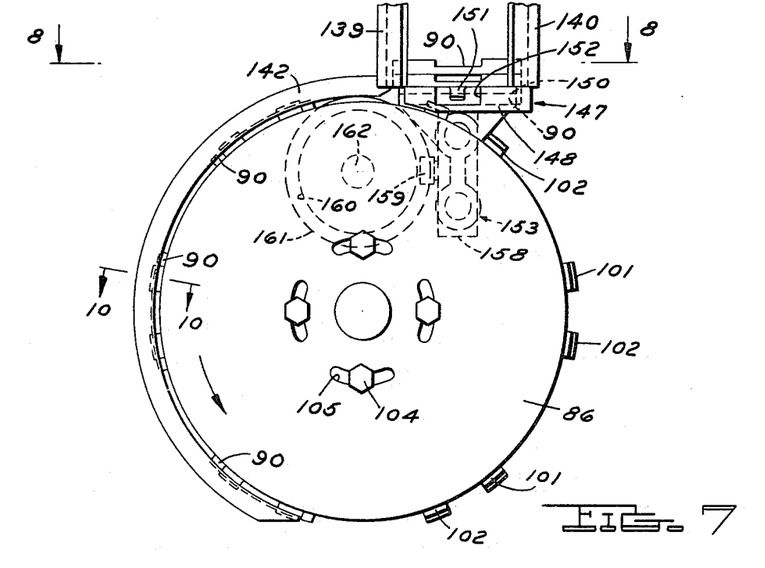
FIG. 7 is an enlarged, fragmentary, vertical view of the structure illustrated in FIG. 3, taken along the line 7—7 thereof, and looking in the direction of the arrows.
Figure 8:
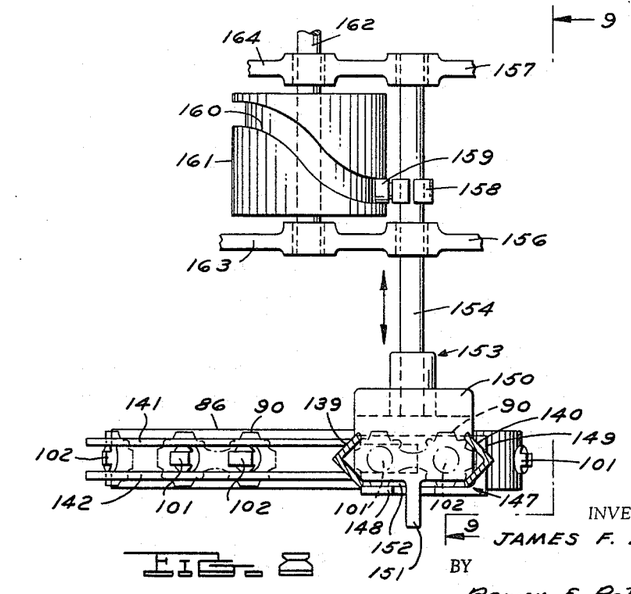
FIG. 8 is a horizontal view, with parts in section and parts broken away, of the structure illustrated in FIG. 7, taken along the line 8—8 thereof, and looking in the direction of the arrows.

As shown in FIGS. 3, 7 and 8, the clips 90 are adapted to move downwardly by gravity from the stack disposed over the applicator drum 86 into a guide track formed by a pair of spaced apart angle bars 139 and 140. As viewed in FIG. 7, it will be seen that as the clip applicator drum 86 rotates in a counter-clockwise direction, the first or leading lug 101 will engage the front finger hole 94 in the lowermost clip 90 and carry the clip on the periphery of the drum. Continued rotation will move the trailing lug 102 into engagement with the other finger hole 95. A pair of spaced apart, semicircular guide plates 141 and 142 are disposed about one-half the periphery of the clip applicator drum 86 and they are adapted to slidably engage the outer surface of the clips 90 held on the drum and help to retain the same on the drum as it continues its counter-clockwise rotation, as viewed in FIG. 7. The clip guide plates 142 are fixedly secured to the guide angle bar 139 by any suitable means, as by welding. The angle bars 139 and 140 may be fixedly secured to any suitable supporting means as, for example, to the plate 137. The bottom clip applicator drum 87 is provided with a similar guide track means for feeding the clips from the magazine drum 89 downwardly and into engagement with the applicator drum 87. The plate 138 mounted on the bottom of the magazine drum 89 is provided with a suitable opening for alignment with the outermost stack of clips to permit the same to pass downwardly by gravity into the guide track formed by the spaced apart angle bars 143 and 144. The angle bars 143 and 144 are fixedly secured together by a plurality of cross bars 145. As shown in FIG. 3, the angle bars are curved inwardly and upwardly at the lower end thereof to a position immediately beneath the clip applicator drum 87. The angle bars 143 and 144 are fixedly secured to the plate 138 or to any other suitable structure. A pair of clip guide plates similar to the curved guide plates 141 and 142 are also mounted around one-half of the periphery of the bottom clip applicator drum 87, and the outer plate is indicated by the numeral 146 in FIG. 1.

Figures 9, 10, 11:
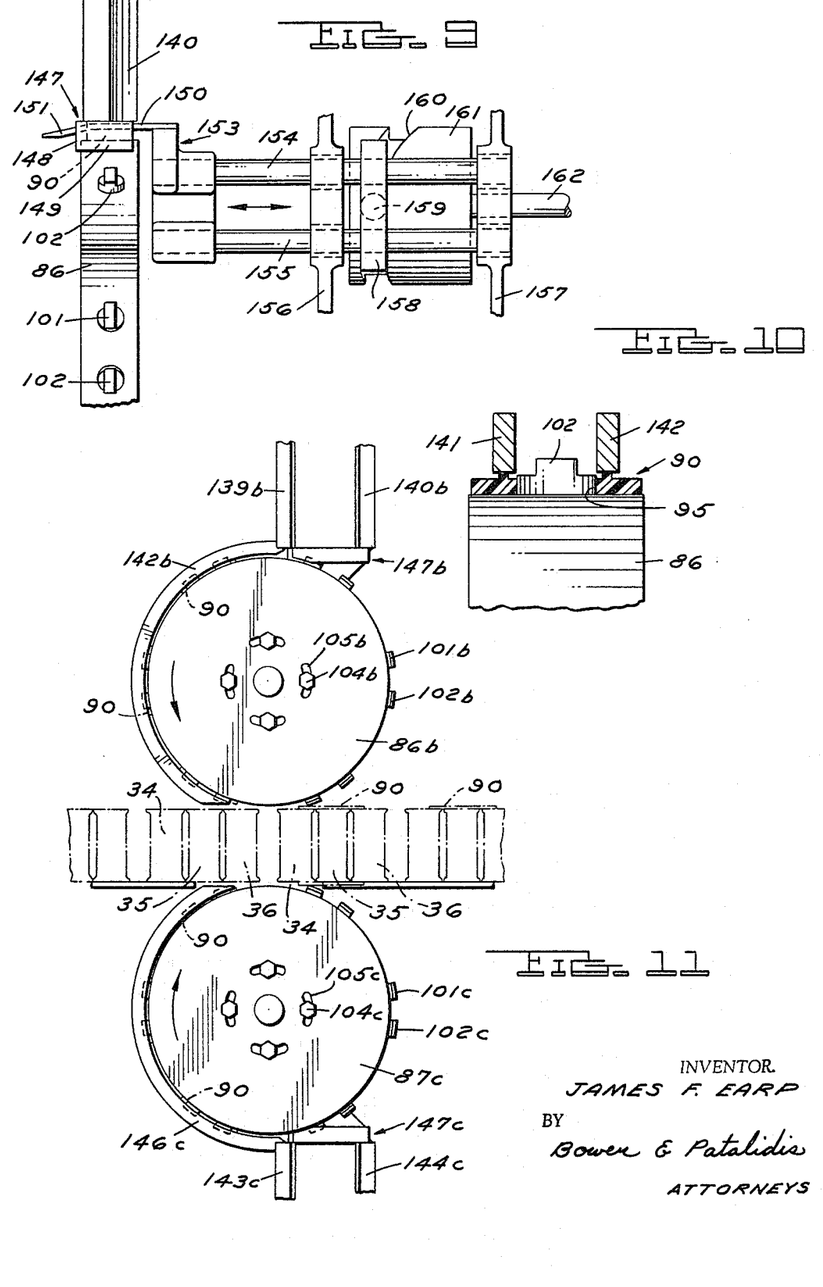
FIG. 9 is a fragmentary, vertical view of the structure illustrated in FIG. 8, taken along the line 9—9 thereof, and looking in the direction of the arrows.
FIG. 10 is an enlarged, fragmentary, sectional view of the structure illustrated in FIG. 7, taken along the line 10—10 thereof, and looking in the direction of the arrows.
FIG. 11 is a fragmentary, front, elevational view of a second embodiment of the invention.

The clip magazine feeder means is provided with a pair of selector fingers for pushing the clips 90 into engagement with the rotary clip applicator drums 86 and 87. As shown in FIGS. 7, 8 and 9, the discharge guide member generally indicated by the numeral 147 is fixedly secured to the lower ends of the clip guide track angle bars 139 and 140. The discharge member 147 comprises a vertical plate 148 which extends downwardly toward the clip applicator drum 86 and toward the front face thereof. The guide member 147 further includes a transverse, downwardly extending vertical plate 149 which is fixed to the rear end of the plate 148. The plates 148 and 147 form a guide box which is open on the lower end thereof and on the front and rear sides thereof. As shown in FIGS. 7 and 8, a horizontally disposed plate 150 is provided with a flexible finger 151 on the front side thereof, and the plate 150 is adapted to be moved into the discharge guide member 147 between the lowermost clip 90 and the next above clip so as to separate these two clips and force the lowermost clip into engagement with the clip applicator drum 86. The finger 151 is adapted to extend through the hole 152 formed in the guide wall 148. The clip separator plate 150 is fixedly mounted on its inner end on the carrier bracket generally indicated by the numeral 153, as shown in FIGS. 8 and 9. The carrier bracket 153 is fixedly secured to the front end of a pair of vertically spaced apart, rearwardly extending shafts 154 and 155. These shafts 154 and 155 are adapted to extend into the housing 107 and to be slidably supported in the brackets 156 and 157 which are fixedly mounted inside of the housing 107. The carrier arm 158 is fixedly mounted on the inner ends of the shafts 154 and 155 and carries the cam follower 159. As shown in FIG. 8, the cam follower 159 is adapted to be operatively mounted in the cam groove 160 formed in the rotatable cam 161. The cam 161 is fixedly secured to the shaft 162 which is suitably rotatably supported between the brackets 163 and 164 which are in turn connected to the brackets 156 and 157, respectively. As indicated in FIG. 3, the drive shaft 162 for the cam 161 may be suitably driven by a conventional gear train, indicated by the numeral 165, for driving connection to the shaft 106. The gear train 165 would be provided with a 6 to 1 ratio so as to turn the cam 161 six times to each revolution of the clip applicator drum 86 for pressing six clips onto the six clip holding positions on the drum 86.

The bottom clip applicator drum 87 would be provided with a similar clip selector finger means generally indicated by the numeral 166. The corresponding parts of the applicator finger means 166 which are identical to the parts of the finger clip selector means are marked with the same reference numerals followed by the small letter "x." The clip guide track is also provided with a discharged guide member 147a which functions in the same manner as the guide member 147. It will be understood that the drive shaft 162a for the lower selector finger means 151a is adapted to be driven by the lower clip applicator drum drive shaft 109 which is disposed in the base member 10.

In operation, assuming the can guide and track means have been manually loaded with a double line of cans, the motor means 110 of the power drive means would be energized, driving the two power drive chains 114 and 116. The chains 114 and 116 will drive the aforedescribed can grouping and transfer means, the rotary clip applying means and the clip magazine feeder means in a pre-determined timed relationship to apply clips 90 to the top and bottom ends of each group of six cans formed by the can grouping and transfer means. Experience has shown that the machine of the present invention is capable of packaging up to one thousand cans per minute in packages of six cans each. As viewed in FIG. 2, the chain mechanisms 13 and 14 function to group the cans into groups of six each and convey these groups longitudinally of the machine or to the right as viewed in FIG. 2. As each group of six cans is moved under the rotary clip applying drum 86, a clip is applied to the top thereof for retaining the group in a compact package. Each group of six cans is then moved down the can guide and track means by the chains 13 and 14 into a position over the clip applying drum 87 which applies a second clip to the bottom ends of each group of six cans. The finished packages are then discharged onto the discharge conveyor 83, which may be of any suitable type.

It will be understood that the clips 90 are being continuously fed from the stacks on the feed magazine drums 88 and 89 and particularly from the stack mounted over the respective clip guide track means. It will also be understood that as the clip applicator drums 86 and 87 rotate, the selector plates 150 and 150a will be moved inwardly and outwardly with respect to the guide members 147 and 147a, respectively, so as to separate the last two clips in the clip guide tracks at the discharge ends thereof and force the end clip into retaining engagement with the lugs 101 and 102 on the respective clip applicator drum.

Figure 12:
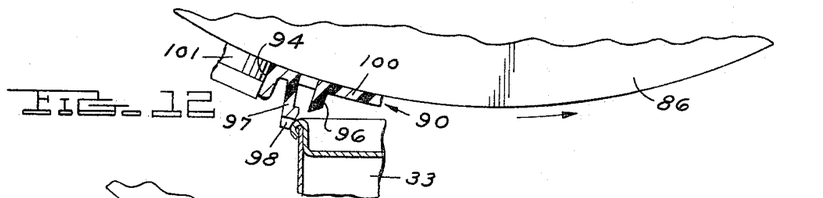
FIG. 12 is a schematic, fragmentary, elevational view of the machine's top clip applicator at the start of a clip applying operation, and showing a portion of a clip in section.
Figure 13:
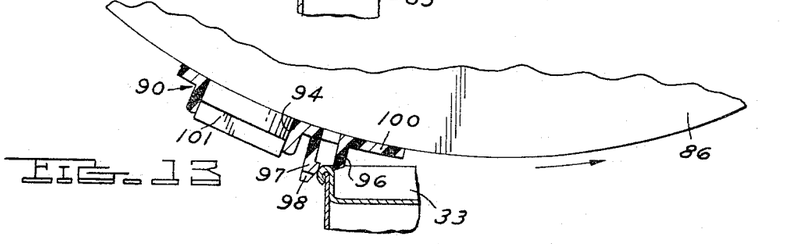
FIGS. 13, 14 and 15 are schematic views, similar to FIG. 12, and showing the top clip applicator in three successive clip applying positions.
Figure 14:
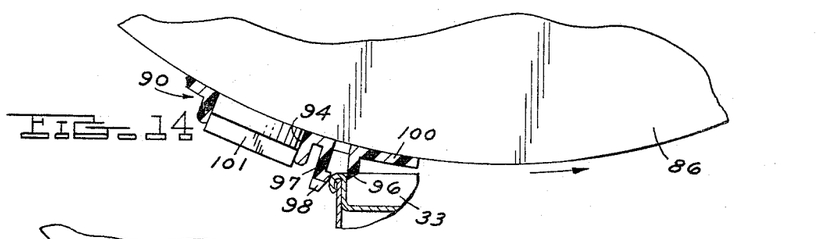
Figure 15:
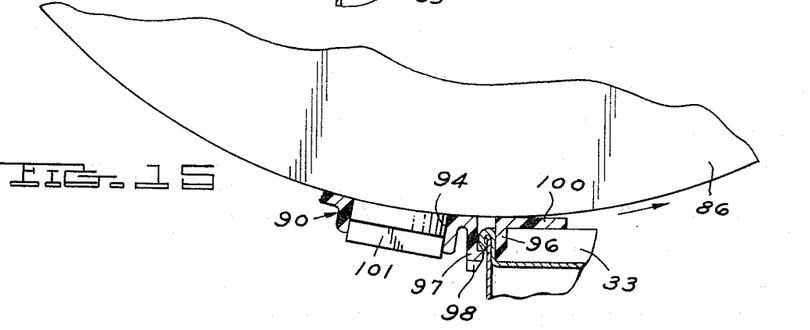

The clips 90 are retained on the respective clip applicator drums until they are brought into engagement with the top and bottom ends of the cans. FIGS. 12 through 15 show the application of a set of inner and outer gripping lips to the rim of a can. As shown in FIG. 12, when the top clip applicator drum 86 moves a clip 90 into a position over the rim of one of the leading cans 33, the guide finger 98 will engage the outer side of the can rim and cam the outer gripping lip 97 away from the inner gripping lip 96 to permit easy entry of the can rim between these two gripping lips. FIG. 13 shows the can rim entering the space between the two gripping lips 96 and 97. FIG. 14 shows a further spreading action between the gripping lips 96 and 97. FIG. 15 shows the rim of the can firmly in position between the two gripping lips 96 and 97. The applying action shown in FIGS. 12 through 15 is simultaneously being effected on the can 36 which is disposed beside the can 33. As the applicator drum 86 continues its counter-clockwise rotation as viewed in FIGS. 12 through 15, it will apply the rest of the clip 90 to the succeeding four cans in the six-pack being operated on. After the top clip 90 has been applied, the six-pack is moved forward or to the right as shown in FIG. 2, and a similar clip applying action is carried out by the bottom clip applicator drum 87.

FIG. 11 illustrates a second embodiment of the invention in which the top and bottom clip applicators have been disposed in vertical alignment. The top clip applicator drum has been indicated by the numeral 86b and the corresponding coacting structure has been similarly indicated by the same reference numerals as used in the first embodiment followed by the small letter "b." The same reference numerals as used in the first embodiment have also been applied to the bottom clip applicator shown in FIG. 11 and these numerals have been followed by the small letter "c." The embodiment of FIG. 11 functions in the same manner as the aforedescribed first embodiment of the invention. The only difference is that the top and bottom clips would be simultaneously applied instead of being successively applied.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. An automatic machine for applying combination packaging and carrying handle clips to six-packs of cans, comprising:
    (a) an elongated base member,
    (b) a continuously operating rotary clip applying means mounted on said base member for applying a clip to at least the top end of a pack of six cans as the pack is moved past the rotary clip applying means,
    (c) a clip magazine feeder means for storing and feeding clips to the rotary clip applying means,
    (d) a can grouping and transfer means operatively mounted on said base member and extending longitudinally thereof, for grouping cans fed to the machine into packs of six cans each, and moving said packs into operative engagement with said rotary clip applying means,
    (e) power drive means for operating the can grouping and transfer means, the rotary clip applying means and the clip magazine feeder means in a predetermined timed relationship,
    (f) said clip magazine feeder means comprises at least one rotatable drum provided with a plurality of clip storing stack means,
    (g) a clip guide track for conveying the clip from said drum to said rotary clip applying means, and
    (h) a clip selector means at the discharge end of the clip guide track for pressing the clips onto the rotary clip applying means.

2. An automatic machine for applying combination packaging and carrying handle clips to six-packs as defined in claim 1, wherein:
    (a) said continuously operating rotary clip applying means includes a pair of coacting drums which are adapted to operate successively on a six-pack of cans for applying a clip to the top of the six-pack and then a clip to the bottom of the six-pack.

3. An automatic machine for applying combination packaging and carrying handle clips to six-packs as defined in claim 1, wherein:
    (a) said continuously operating rotary clip applying means includes a pair of coacting drums which are adapted to operate simultaneously to apply clips to both the top and bottom of the six-pack.

4. An automatic machine for applying combination packaging and carrying handle clips to six-packs as defined in claim 1, wherein:
    (a) said can grouping and transfer means includes a can track and guide means for guiding the cans past the rotary clip applying means,
    (b) a power transfer means for moving the cans along said can track and guide means, and
    (c) a grouping and spacing means carried by said power transfer means for engaging said cans and separating them into groups of six cans each for transfer by said power transfer means.

5. An automatic machine for applying combination packaging and carrying handle clips to six-packs as defined in claim 4, wherein:
(a) said power transfer means includes a pair of horizontally disposed chain mechanisms disposed on opposite sides of said can track and guide means, and
(b) said grouping and spacing means comprises a plurality of rollers and plates, respectively, on each of said chain mechanisms.

6. An automatic machine for applying combination packaging and carrying handle clips to six-packs of cans, comprising:
(a) an elongated base member,
(b) a pair of vertically disposed rotatable clip applying drums operatively mounted on said base member for applying a clip to each of the top and bottom ends of a pack of six cans as the pack is moved past said drums,
(c) a clip magazine feeder means for storing and feeding clips to the rotary clip applying drums,
(d) a can grouping and transfer means operatively mounted on said base member and extending longitudinally thereof, for grouping cans fed to the machine into packs of six cans each, and moving said packs into operative engagement with said rotatable clip applying drums,
(e) power drive means for operating the can grouping and transfer means, the rotatable clip applying drums and the clip magazine feeder means in a predetermined timed relationship,
(f) one of said clip applying drums being disposed above said can grouping and transfer means and the other of said rotatable clip applying drums being disposed below said can grouping and transfer means,
(g) said clip magazine feeder means comprises a pair of rotatable clip storage drums provided with a plurality of clip storing stack means,
(h) a clip guide track for each of said clip storage drums for conveying the clips from said drums to said rotatable clip applying drums, and
(i) a clip selector means at the discharge end of each of the clip guide tracks for pressing the clips onto the rotatable clip applying drums.

7. An automatic machine for applying combination packaging and carrying handle clips to six-packs as defined in claim 6, wherein:
(a) said can grouping and transfer means includes a can track and guide means for guiding the cans past the rotatable clip applying drums,
(b) a power transfer means for moving the cans along said can track and guide means, and
(c) a grouping and spacing means carried by said power transfer means for engaging said cans and separating them into groups of six cans each for transfer by said power transfer means.

8. An automatic machine for applying combination packaging and carrying handle clips to six-packs as defined in claim 6, wherein:
(a) said power transfer means includes a pair of horizontally disposed chain mechanisms disposed on opposite sides of said can track and guide means, and
(b) said grouping and spacing means comprises a plurality of rollers and plates, respectively on each of said chain mechanisms.

9. An automatic machine for applying combination packaging and carrying handle clips to six-packs of cans, comprising:
(a) an elongated base member,
(b) a continuously operating rotary clip applying means mounted on said base member for applying a clip to at least the top end of a pack of six cans as the pack is moved past the rotary clip applying means,
(c) a clip magazine feeder means for storing and feeding clips to the rotary clip applying means,
(d) a can grouping and transfer means operatively mounted on said base member and extending longitudinally thereof, for grouping cans fed to the machine into packs of six cans each, and moving said packs into operative engagement with said rotary clip applying means,
(e) said can grouping and transfer means includes a can track and guide means for guiding the cans past the rotary clip applying means,
(f) a power transfer means for moving the cans along said can track and guide means including a pair of horizontally disposed, vertically aligned endless chains disposed on opposite sides of said can track and guide means,
(g) each pair of said chains being provided with a plurality of vertically disposed transversely aligned grouping rollers spaced apart a predetermined distance to separate the cans into groups of six cans each, and
(h) each said grouping roller provided with a spacer plate disposed a predetermined distance ahead of its associated roller to group the lead four cans of each pack in the proper spacing prior to the movement of the trailing pairs of cans into their clip applying position.

References Cited by the Examiner
UNITED STATES PATENTS 2,892,296  6/1959  Fisher ____________ 53—48 X
3,196,589  7/1965  Cook _____________ 53—48
3,218,777  11/1965 Brunsing __________ 53—48

GRANVILLE Y. CUSTER, Jr., *Primary Examiner.*